United States Patent
Stefan

(10) Patent No.: US 6,679,320 B2
(45) Date of Patent: *Jan. 20, 2004

(54) VEHICLE AIR CONDITIONING CIRCUIT USING A REFRIGERANT FLUID IN THE SUPERCRITICAL STATE

(75) Inventor: Karl Stefan, Paris (FR)

(73) Assignee: Valeo Climatisation, La Verriere (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 121 days.

(21) Appl. No.: 09/320,107

(22) Filed: May 26, 1999

(65) Prior Publication Data

US 2001/0003311 A1 Jun. 14, 2001

(30) Foreign Application Priority Data

May 28, 1998 (FR) .............................. 98 06739

(51) Int. Cl.⁷ .............................. F25B 29/00; F25B 1/00
(52) U.S. Cl. ............................ 165/202; 165/42; 165/43; 165/240; 62/114; 62/113; 62/115; 62/513; 62/196.4; 62/503; 62/DIG. 17; 62/228.4; 62/228.5; 237/2 B
(58) Field of Search ............................ 165/42, 43, 202, 165/240, 241, 242; 62/115, 114, 113, 513, DIG. 17, 196.4, 503, 228.4, 228.5; 237/2 B

(56) References Cited

U.S. PATENT DOCUMENTS

| | | | | |
|---|---|---|---|---|
| 2,482,171 A | * | 9/1949 | Gygax ........................... | 62/513 |
| 2,645,101 A | * | 7/1953 | La Porte ........................ | 62/513 |
| 2,884,768 A | * | 5/1959 | Gould ........................... | 62/513 |
| 2,961,848 A | * | 11/1960 | Nonomaque .................. | 62/513 |
| 4,748,818 A | * | 6/1988 | Satterness et al. ............. | 62/160 |
| 4,912,933 A | * | 4/1990 | Renken ......................... | 62/160 |
| 5,056,324 A | * | 10/1991 | Haley ......................... | 62/324.4 |
| 5,245,836 A |   | 9/1993 | Lorentzen et al. ............. | 62/174 |
| 5,291,941 A |   | 3/1994 | Enomoto et al. .............. | 165/43 |
| 5,669,223 A | * | 9/1997 | Haley et al. .................. | 62/160 |
| 5,685,160 A | * | 11/1997 | Abersfelder et al. ........... | 62/115 |
| 5,740,681 A | * | 4/1998 | Karl ............................. | 62/115 |
| 5,910,157 A | * | 6/1999 | Noda ........................... | 165/43 |
| 5,975,191 A | * | 11/1999 | Ohashi et al. ................. | 165/43 |
| 6,044,655 A | * | 4/2000 | Ozaki et al. ........... | 62/DIG. 17 |
| 6,058,727 A | * | 5/2000 | Fraser, Jr. et al. ............. | 62/513 |
| 6,073,454 A | * | 6/2000 | Spauschus et al. ............ | 62/112 |
| 6,105,386 A | * | 8/2000 | Kuroda et al. ................. | 62/513 |

FOREIGN PATENT DOCUMENTS

| | | | | |
|---|---|---|---|---|
| EP | 0 756 954 A2 |   | 2/1997 | |
| GB | 190615 | * | 12/1922 | ................... 62/513 |
| GB | 2306497 | * | 7/1997 | |
| JP | 0083140 | * | 7/1978 | ................... 62/513 |
| JP | 5-178078 | * | 7/1993 | |
| JP | 6-123527 | * | 5/1994 | |
| JP | 6-239131 | * | 8/1994 | |
| JP | 406317358 | * | 11/1994 | ................... 62/513 |
| JP | 7-305923 | * | 11/1995 | |
| WO | 93/06423 |   | 4/1993 | |
| WO | WO 95/24324 | * | 9/1995 | |

OTHER PUBLICATIONS

French Search Report dated Mar. 3, 1999.

* cited by examiner

Primary Examiner—John K. Ford
(74) Attorney, Agent, or Firm—Morgan & Finnegan, LLP

(57) ABSTRACT

Refrigerant fluid such as $CO_2$, compressed to the supercritical pressure by a compressor, is delivered selectively through a three-way valve, either into a branch of the circuit containing a cooler, an expansion device and an evaporator for cooling the cabin of a vehicle, or into a branch containing another expansion device and a heat exchanger for the purpose of heating the cabin.

19 Claims, 4 Drawing Sheets

VEHICLE AIR CONDITIONING CIRCUIT USING A REFRIGERANT FLUID IN THE SUPERCRITICAL STATE

FIELD OF THE INVENTION

This invention relates to air conditioning apparatus. In particular, the invention is directed to air conditioning apparatus, especially for the cabin of a vehicle, in which the apparatus includes: a first circuit branch for the flow of a refrigerant fluid therein, the first circuit branch containing a compressor which is arranged to receive the refrigerant fluid in the gaseous state and to compress it to a supercritical pressure, and a second circuit branch containing a first heat exchanger which is adapted to cool the fluid compressed by the compressor at a substantially constant pressure, by transferring heat from a first external medium to the fluid; a first expansion device which is adapted to reduce the pressure in the fluid leaving the first heat exchanger, so as to put at least some of the fluid in the liquid state; and an evaporator which is arranged to change the state of the fluid received from the first expansion device from the gaseous to the liquid state at a substantially constant pressure, by taking heat from a second external medium for the purpose of cooling the space (for example the cabin of a vehicle) which is to be air conditioned. The fluid thus vaporised is then aspirated by the compressor.

BACKGROUND OF THE INVENTION

Forms of apparatus of the above general type are described for example in the specifications of International Patent Publication No. WO93/06423, U.S. Pat. Nos. 5,245, 836 and U.S. Pat. No. 5,291,941. The refrigerant fluid used in these apparatuses is typically carbon dioxide ($CO_2$).

Where it is not required to cool the air which is to be delivered into the cabin of a vehicle, but merely to heat it, it is usual to make use of the heat which is produced by the propulsion engine of the vehicle, for example by passing air in contact with a heating radiator through which the engine coolant fluid flows. When the engine is cold, no heat can be drawn from it for the purpose of heating the cabin. This results in a considerable delay before the cabin can be brought to the required temperature, and is consequently detrimental to the comfort of the occupants of the vehicle. In some cases, the coolant liquid never, during the whole duration of a journey, reaches a high enough temperature to warm the occupants as they would wish.

In order to enable the cabin to be brought to the required temperature more quickly, various supplementary devices may be used, in particular those which involve the use of heaters or electrical radiators, but these are somewhat expensive.

DISCUSSION OF THE INVENTION

An object of the present invention is to enable a space, for example the cabin of a vehicle, to be heated more rapidly than hitherto when the engine is cold, or to top up the quantity of heat where the heat available is insufficient, without the need to provide any costly specific means for this purpose.

According to the invention, an air conditioning apparatus, especially for the cabin of a vehicle, including for the flow of a refrigerant fluid therein, comprises a circuit having: a first circuit branch which contains a compressor adapted to receive the said fluid in the gaseous state and to compress it to a supercritical pressure, and a second circuit branch containing a first heat exchanger arranged to cool the fluid compressed by the compressor at a substantially constant pressure, by transferring heat to a first external medium; a first expansion device adapted to reduce the pressure of the fluid leaving the first heat exchanger so as to put at least some of this fluid into the liquid state; and an evaporator to put into the gaseous state the fluid derived in the liquid state from the first expansion device, at a substantially constant pressure by taking heat from a second external medium for cooling the space to be air conditioned, with the fluid thus vaporised being subsequently aspirated by the compressor, is characterised in that the circuit further includes a third branch which is disposed in parallel with the second branch and which contains a second expansion device and a second heat exchanger, for transferring heat from the refrigerant fluid to the said second external medium so as to heat the said space, means being provided for causing the fluid to flow selectively in an air conditioning loop constituted by the said first and second branches, or in a heating loop constituted by the said first and third branches.

The second expansion device may be disposed either upstream or downstream of the second heat exchanger.

A first pressure sensor is preferably disposed in the first branch, downstream of the compressor.

A second pressure sensor is preferably disposed in the second branch, between the first heat exchanger and the first expansion device.

A non-return valve is preferably disposed in the second branch, downstream of the evaporator.

According to a preferred feature of the invention, the circuit includes at least one internal heat exchanger which is adapted to transfer heat between one section of the first branch, situated downstream of the compressor, and either a section of the second branch situated between the first heat exchanger and the first expansion device, or a section of the third branch which is situated upstream of the second heat exchanger.

In some embodiments of the invention, the above mentioned sections of the first, second and third branches may contain, respectively, the three heat exchanger elements of a three-way internal heat exchanger.

In other embodiments, the said sections of the first and second branches contain respectively the two ways, or heat exchanger elements, of a two-way internal heat exchanger, while the said sections of the first and third branches contain respectively the two ways, or heat exchanger elements, of a two-way second internal heat exchanger.

The said section of the third branch may be situated either downstream or upstream of the second expansion device.

A third expansion device is preferably disposed in the third branch upstream of the said section of the third branch.

The said section of the second branch is situated upstream of the second pressure sensor, where the latter is provided.

The said second external medium is preferably a stream of air which is then passed into the space such as the cabin of the vehicle.

The evaporator and the second heat exchanger are disposed in series, in that order, in the path of the said stream of air in preferred arrangements.

A heat source external to the refrigerant fluid circuit is preferably disposed in the path of the said stream of air. It may be disposed in this path downstream of the second heat exchanger, or between the evaporator and the second heat exchanger.

Means are preferably provided for varying the thermal power transmitted from the second heat exchanger to the said second external medium. These power varying means may comprise means for adjusting the second expansion device and/or the third expansion device. They may, alternatively or in addition, comprise means for adjusting the capacity or speed of the compressor.

Preferably, a reservoir is disposed in the air conditioning circuit upstream of the compressor.

The various features and advantages of the invention will appear more clearly on a reading of the following detailed description of some preferred embodiments of the invention, which are given by way of non-limiting example only and with reference to the accompanying drawings, in which those elements which are identical or similar to each other are designated in all the Figures by the same reference numerals.

BRIEF DESCRIPTION OF THE DRAWINGS

FIGS. 1 to 4 show, respectively, a first, a second, a third and a fourth embodiment of the invention, by way of example.

DESCRIPTION OF PREFERRED EMBODIMENTS OF THE INVENTION

Figure 1:
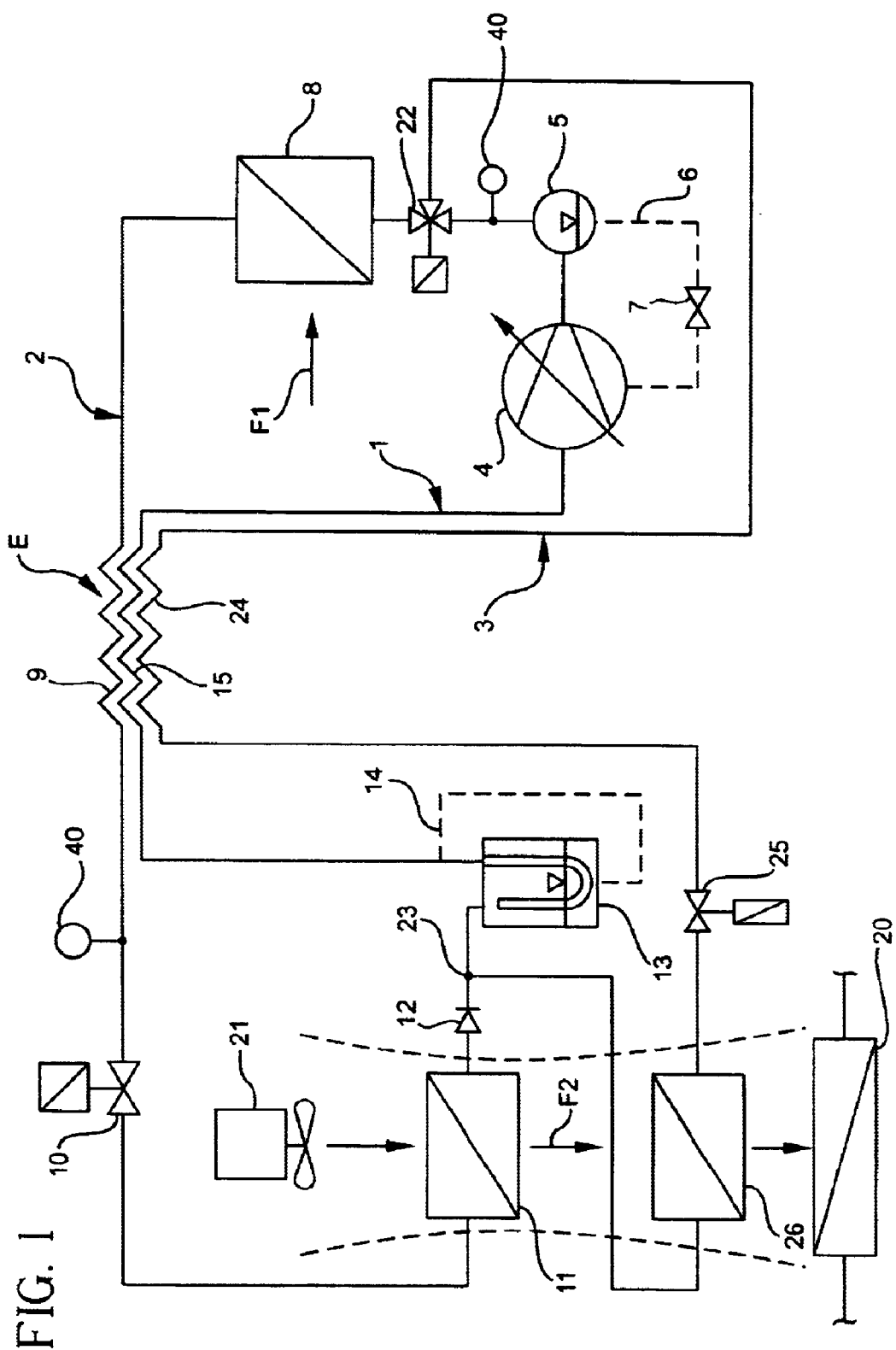
FIGS. 1 to 4 of the drawings are diagrammatic representations, simplified where appropriate, showing four different versions of an air conditioning apparatus for the cabin of a motor vehicle, in accordance with the invention.

In the present description, the expression "air conditioning apparatus" means an apparatus which enables the temperature in a space (such as the cabin of a vehicle) to be regulated, either by removing heat from that space or by putting heat into the space, according to the requirements of the user. Each of the embodiments of the apparatus shown in the drawings comprises a refrigerant fluid circuit which has three branches 1, 2 and 3. The branches 1 and 2 constitute a so-called air conditioning loop which is used to extract heat from the cabin; the branches 1 and 3 together constitute a heating loop whereby heat is supplied to the cabin. This circuit is arranged to enable the pressure of a refrigerant fluid, and especially carbon dioxide, to vary on either side of the critical pressure.

A brief description will first be given of the air conditioning loop, which is practically identical in the four versions shown in the drawings, and which is known per se. This loop comprises a compressor 4, which in the examples shown is of a variable output type, though it will of course be understood that the compressor need not be of a variable output type. The compressor 4 is followed in the loop by an oil separator 5, from which oil is delivered to the compressor through a feedback line 6 which includes an expansion device 7 for reducing fluid pressure. A heat exchanger 8 enables some of the heat produced by the refrigerant fluid during its compression in the compressor 4 to be transferred to a stream of air F1.

Connected to the heat exchanger 8, downstream of the latter, is a heat exchanger element 9 of an internal heat exchanger E. This, in this example, is a three-way heat exchanger for supplementary cooling of the fluid, comprising heat exchanger elements 9, 15 and 24 in heat transfer relationship with each other. Connected in the circuit downstream of the heat exchanger element 9 is another expansion device 10, downstream of which an evaporator 11 is connected in the circuit. A further stream of air F2 is passed through the evaporator 11, after which this air is delivered into the cabin of the vehicle. A non-return valve 12 is provided at the outlet of the evaporator. From the outlet of the evaporator 11, the fluid is passed, via the valve 12, into a reservoir 13, which has a liquid return line 14.

The reservoir 13 prevents refrigerant fluid in the liquid state from being introduced into the compressor 4. In addition, the reservoir 13 provides a reserve of fluid which enables any variations in load, or fluid charge, in the refrigerant circuit, to be compensated for. The reservoir 13 has a main outlet for refrigerant fluid in the gaseous state, and this outlet is connected to the second heat exchanger element 15 of the internal heat exchanger E. The fluid flows in the heat exchanger element 15 in contraflow with respect to the flow in the element 9. From the heat exchanger element 15, the fluid returns to the compressor 4.

Again in a manner known per se, a heating radiator 20, which is the conventional radiator in which coolant fluid from the engine of the vehicle is cooled, is arranged downstream of the evaporator 11 in the air stream F2. The stream of air F2 is produced by a conventional motorised fan unit 21.

A three-way valve 22 is disposed in the air conditioning loop, between the oil separator 5 and the heat exchanger 8. The three-way valve 22 is arranged to be controllable in such a way as to deliver the compressed refrigerant fluid into the branch 3, which terminates at a junction point 23 situated between the non-return valve 12 and the reservoir 13. The branch 1, i.e. the branch which is common to both the air conditioning and heating loops, extends from the junction point 23 to the three-way valve 22 via the reservoir 13, the heat exchange element 15 of the internal heat exchanger E, the compressor 4 and the oil separator 5. The second branch 2 of the air conditioning loop extends from the three-way valve 22 to the junction point 23, via the heat exchanger 8, the heat exchange element 9 of the heat exchanger E, the expansion device 10, the evaporator 11 and the non-return valve 12.

In the embodiment shown in FIG. 1, in the three-way internal heat exchanger E, heat is transferable between the heat exchange element 15 and either the second element 9 or the third heat exchange element 24, which is disposed in the second branch 3 of the heating loop. The fluid flows in the heat exchange element 24 in contraflow to that in the element 15. Considering the branch 3 in the direction of flow of the fluid in it, the heat exchange element 24 is followed by an expansion device 25, downstream of which, still in the branch 3, is a further heat exchanger 26 which is in the path of the stream of air F2 between the evaporator 11 and the radiator 20. The refrigerant fluid outlet of the heat exchanger 26 is connected to the junction point 23.

As has been indicated above, the three-way valve 22 can be controlled in such a way that it causes the refrigerant fluid to flow either in the branches 1 and 2, that is to say in the air conditioning loop, or in the branches 1 and 3, that is to say in the heating loop. In the former case, the circuit then functions in the known way for cooling the cabin, while in the latter case heat is transferred from the refrigerant fluid to the stream or air F2 by the heat exchanger 26, thereby enabling the cabin to be heated.

Figure 2:
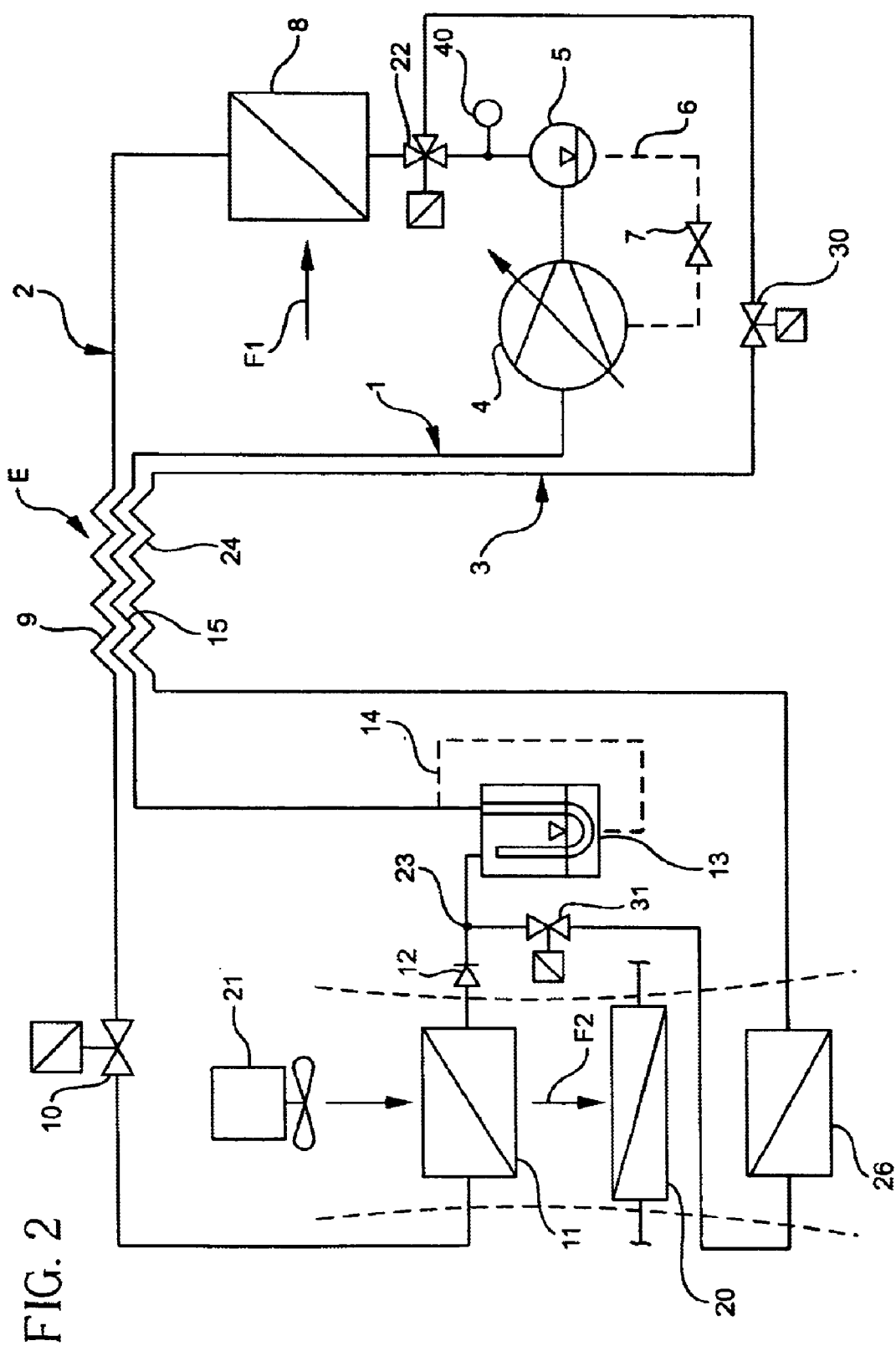

Reference is now made to FIG. 2, in which the refrigerant fluid circuit differs from that shown in FIG. 1 in that the expansion device 25 in the branch 3 is replaced by two expansion devices 30 and 31, which are connected respectively upstream of the third heat exchange element 24 of the internal heat exchanger E, and downstream of the heat exchanger 26. In addition, the heating radiator 20 is interposed between the evaporator 11 and the heat exchanger 26 in the path of the stream of air F2, instead of being downstream of the heat exchanger 26.

Figure 3:
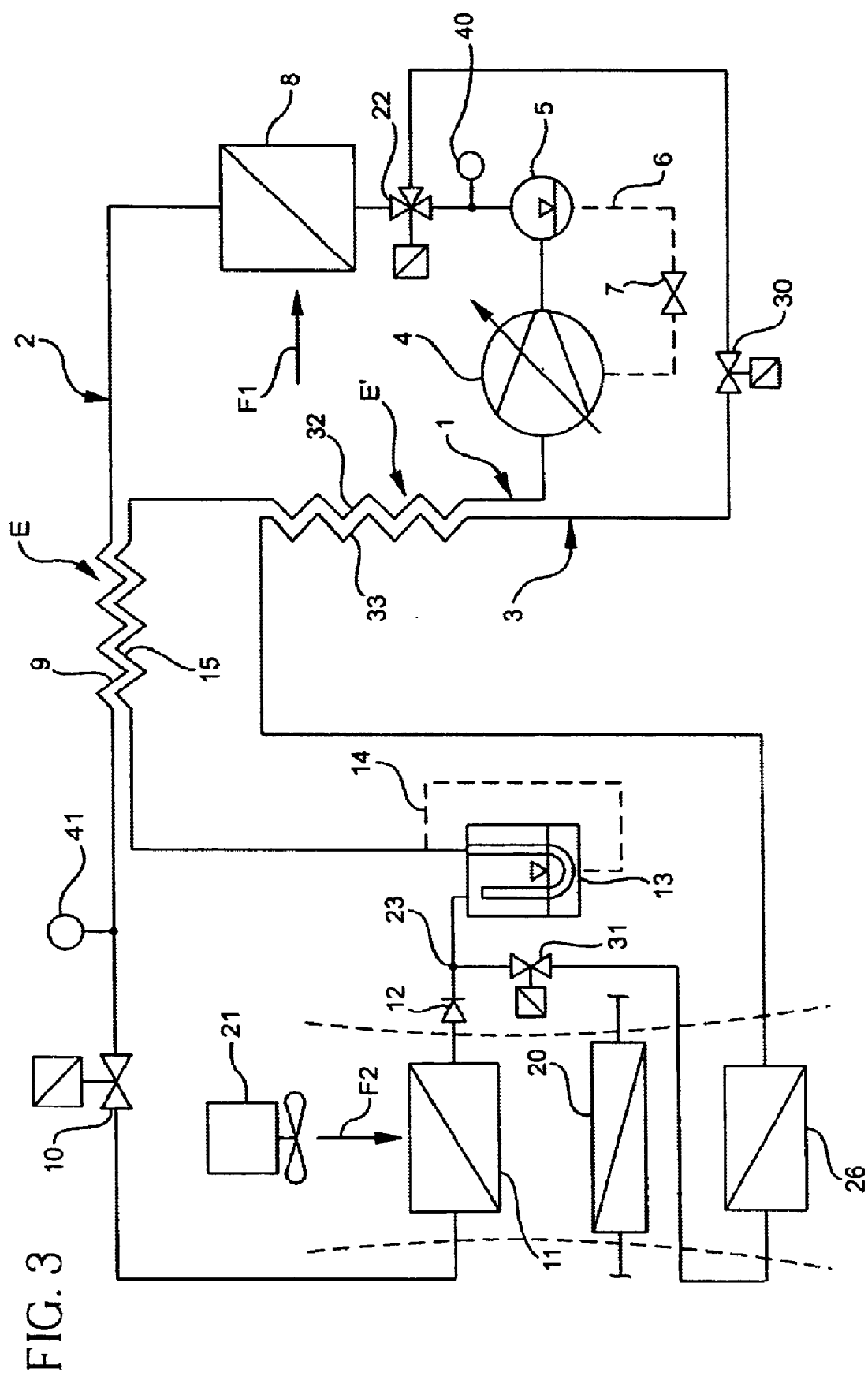

Referring now to FIG. 3, the arrangement shown in this Figure differs from that in FIG. 2 in that the third heat exchanger element 24 of the heat exchanger E is omitted, but a second internal heat exchanger E' is provided instead. The heat exchanger E' is a two-way heat exchanger, the two elements 32 and 33 of which are arranged for heat transfer between them. The heat exchange element 32 is disposed in the branch 1, between the heat exchange element 15 of the other internal heat exchanger E and the compressor 4. The other heat exchange element 33 is disposed in the branch 3 in the same way as the element 24 in FIG. 2, so that the fluid flows in it in contraflow to the fluid flowing in the heat exchange element 32.

Figure 4:
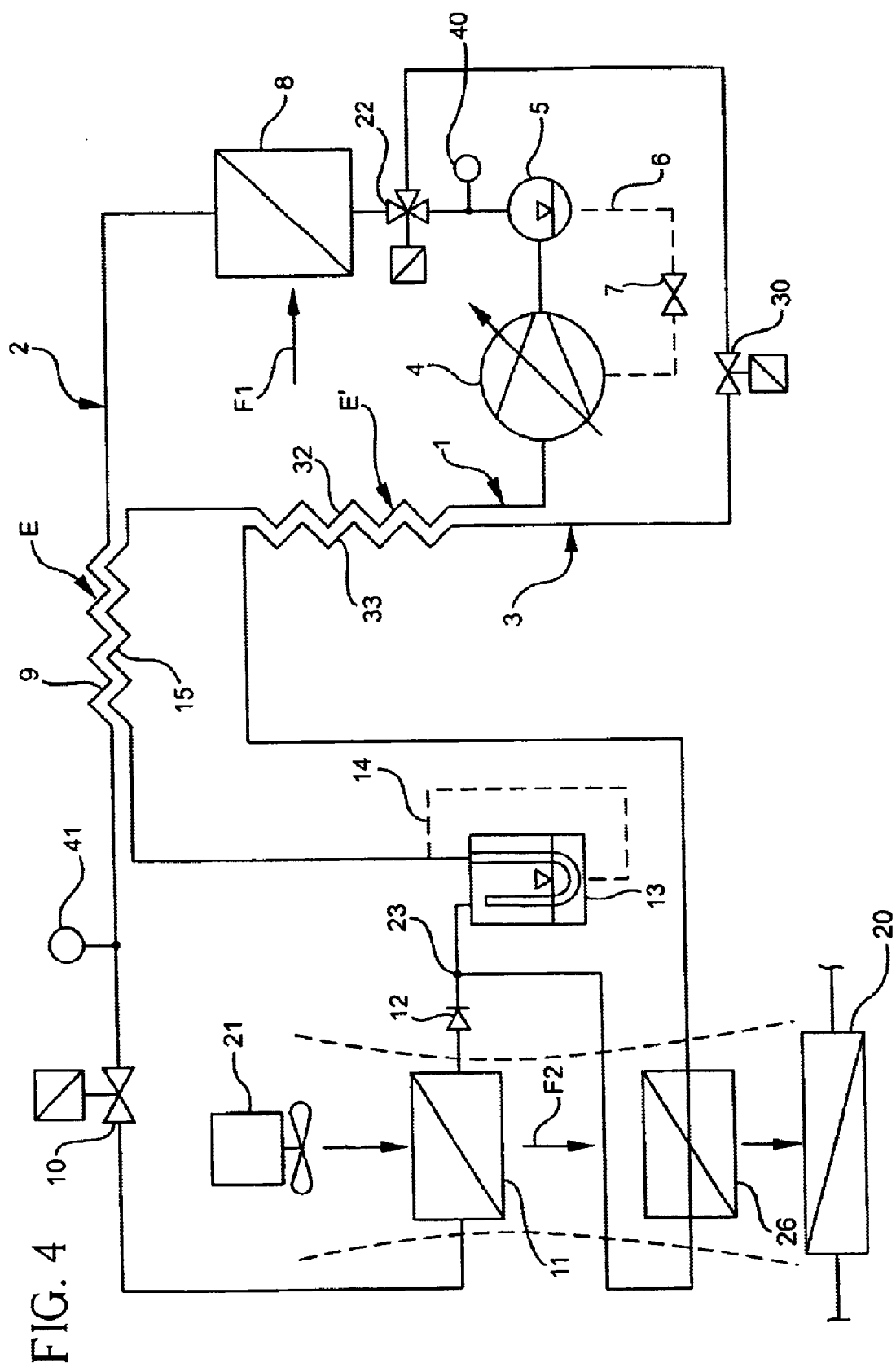

Reference is now made to FIG. 4, in which the circuit again includes internal heat exchangers E and E' similar to those in FIG. 3, together with an air circuit F2 similar to that in FIG. 1 and an expansion device 30 similar to those in FIGS. 2 and 3. However, this expansion device 30 is the only one in the branch 3, the expansion device 31 being omitted.

In all the various embodiments shown in the drawings, a pressure sensor 40 is disposed in the branch 1, between the oil separator 5 and the three-way valve 22. In FIGS. 1, 3 and 4, a second pressure sensor 41 is disposed in the branch 2, between the heat exchange element 9 of the internal heat exchanger E and the expansion device 10. The power in the air conditioning loop is able to be controlled by making use of the sensor 41 if it is present, or the sensor 40. The latter can be used in all cases for controlling the power in the heating loop. Control of the air conditioning loop can be carried out in a known way by acting on the capacity or on the speed of the compressor 4, or by acting on the expansion device 10 appropriately. In addition, control of the heating loop is able to be carried out by acting on the capacity or speed of the compressor or on the expansion device, or devices, 25, 30, 31.

The various circuits illustrated show only some examples of the numerous possibilities which result from all the possible practical combinations of the features described, such as:

the presence of a single expansion device or two expansion devices in the branch 3, and the position of the single expansion device with respect to the heat exchanger 26;

the presence or absence of a pressure sensor in the branch 2;

the use of a three-way internal heat exchanger or two two-way heat exchangers; and/or the disposition of the heating radiator either upstream or downstream of the heat exchanger 26.

What is claimed is:

1. Air conditioning apparatus for treating the atmosphere in a space in a vehicle, the apparatus comprising:

a circuit for flow of a refrigerant fluid therein, the circuit comprising:

a first circuit branch in communication with a valve apparatus at a downstream end of the first circuit branch and terminating at a junction point at an upstream end of the first circuit branch;

the first circuit branch having a compressor disposed upstream of the valve apparatus, the compressor adapted to receive the refrigerant fluid in a gaseous state and to compress the refrigerant fluid to a supercritical pressure;

a second circuit branch selectably connectable with the first circuit branch, the second circuit branch being in communication with the valve apparatus at an upstream end of the second branch and the junction point at a downstream end of the second circuit branch;

the second circuit branch having a first heat exchanger, disposed downstream of the valve apparatus and the compressor for receiving the refrigerant fluid compressed by the compressor and for cooling the refrigerant fluid at substantially constant pressure by transfer of heat therefrom to a first external medium, said first heat exchanger having an inlet and an outlet for the refrigerant fluid;

the second circuit branch further having a first expansion device disposed downstream from the first heat exchanger for receiving said fluid from said first heat exchanger and for reducing the pressure of the refrigerant fluid so as to liquefy at least part of the refrigerant fluid;

the second circuit branch further having an evaporator disposed downstream of the first expansion device for receiving the refrigerant fluid in the liquid state from the first expansion device and for putting the refrigerant fluid into a gaseous state at substantially constant pressure by taking heat from a second external medium to cool the space, the evaporator having an inlet side and an outlet side connected with the junction point;

a third circuit branch having an upstream end connected to the valve apparatus and a downstream end connected to the junction point;

the third branch further having a second expansion device disposed upstream of the junction point and a second heat exchanger disposed between the second expansion device and the junction point, the second heat exchanger for transferring heat from the refrigerant fluid to heat the space; and an internal heat exchanger comprising three heat exchange elements in heat transfer relationship with each other, with one of the heat exchange elements being arranged in the first branch of the circuit so as to constitute a section of the first branch upstream of the compressor; one of the other heat exchange elements constituting a section of the second branch situated between the first heat exchanger and the first expansion device, and the other heat exchange element constituting a section of the third branch situated upstream of the second expansion device, wherein the internal heat exchanger can selectively transfer heat between the section of the first branch and the sections of the second or third branches, respectively;

the valve apparatus comprising fluid flow switching means connected in said first branch and connected with the second and third branches of the circuit for selectively directing the refrigerant fluid to flow in:

a first mode in which the refrigerant fluid flows in the first and second branches, which constitute an air conditioning loop, and a second mode in which the refrigerant fluid flows in the first and third branches, which constitute a heating loop.

2. Apparatus according to claim 1, wherein the second expansion device is disposed upstream of the second heat exchanger.

3. Apparatus according to claim 1, wherein the second expansion device is disposed downstream of the second heat exchanger.

4. Apparatus according to claim 1, further including a first pressure sensor disposed in the first branch downstream of the compressor.

5. The air conditioning apparatus according to claim 4, further including a second pressure sensor disposed in the second branch between the first heat exchange element and the first expansion device.

6. Apparatus according to claim 1, further including a non-return valve disposed in the second branch downstream of the evaporator.

7. The apparatus according to claim 1, wherein:
the first heat exchange element is disposed in a section of the first branch upstream of the compressor;
the second heat exchange element is disposed in a section of the second branch upstream of the first expansion device; and
the third heat exchange element is disposed in a section of the third branch upstream of the second expansion device.

8. Apparatus according to claim 1, wherein the second expansion device is disposed upstream of the second heat exchanger, the section of the third branch being downstream of the second expansion device.

9. Apparatus according to claim 1, wherein the second expansion device is disposed upstream of the second heat exchange element, the heat exchange element of the third branch being situated upstream of the second expansion device.

10. Apparatus according to claim 1, wherein the second expansion device is disposed downstream of the second heat exchanger, the circuit further including a third expansion device disposed in the third branch, upstream of the section of the third branch.

11. The air conditioning apparatus according to claim 1, further including a first pressure sensor disposed in the first branch downstream of the compressor, and a second pressure sensor disposed in the second branch between the first heat exchange element and the first expansion device, the said section of the second branch being situated upstream of the second pressure sensor.

12. Apparatus according to claim 1, further including means for creating a stream of air for delivery into the space and defining a path for the stream of air.

13. The air conditioning apparatus according to claim 12, wherein the evaporator is disposed in the path of the stream of air, the second heat exchange element being disposed upstream of the evaporator in the path.

14. The air conditioning apparatus according to claim 13, further including a heat source external to the refrigerant fluid circuit and disposed in the path of the stream of air downstream of the second heat exchange element.

15. Apparatus according to claim 13, further including a heat source external to the refrigerant fluid circuit and disposed in the path of the stream of air between the evaporator and the second heat exchanger.

16. The air conditioning apparatus according to claim 1, further including means for varying the thermal power transmitted from the second heat exchange element.

17. Apparatus according to claim 10, further including power varying means associated with at least one of the second and third expansion devices, for adjusting the at least one device whereby to vary the thermal power transmitted from the second heat exchanger to the second external medium.

18. Apparatus according to claim 16, wherein the power varying means comprise means associated with the compressor, for adjusting one of: a capacity of the compressor and a speed of the compressor.

19. Apparatus according to claim 1, further including a reservoir disposed in the circuit upstream of the compressor.

* * * * *